(12) United States Patent
Glissmann et al.

(10) Patent No.: US 10,445,677 B2
(45) Date of Patent: Oct. 15, 2019

(54) SYSTEM AND METHOD FOR INTEGRATING TEXT ANALYTICS DRIVEN SOCIAL METRICS INTO BUSINESS ARCHITECTURE

(75) Inventors: Susanne M. Glissmann, San Jose, CA (US); Ana Lelescu, San Jose, CA (US); Ignacio G. Terrizzano, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 13/073,509

(22) Filed: Mar. 28, 2011

(65) Prior Publication Data

US 2012/0253858 A1 Oct. 4, 2012

(51) Int. Cl.
| | | |
|---|---|---|
| *G06Q 10/06* | (2012.01) | |
| *G06Q 30/02* | (2012.01) | |
| *G06F 17/28* | (2006.01) | |
| *G06Q 50/00* | (2012.01) | |

(52) U.S. Cl.
CPC ....... *G06Q 10/06393* (2013.01); *G06F 17/28* (2013.01); *G06Q 30/0201* (2013.01); *G06Q 30/0282* (2013.01); *G06Q 50/01* (2013.01)

(58) Field of Classification Search
USPC ................................................ 705/7.11–7.42
See application file for complete search history.

(56) References Cited

U.S. PATENT DOCUMENTS

| | | | |
|---|---|---|---|
| 7,383,257 B2 | 6/2008 | Cody et al. | |
| 7,493,319 B1 | 2/2009 | Dash et al. | |
| 7,512,605 B2 | 3/2009 | Spangler | |
| 7,548,933 B2 | 6/2009 | Krishnamurthy et al. | |
| 7,779,349 B2 | 8/2010 | Spangler | |
| 7,792,786 B2 | 9/2010 | Chen et al. | |
| 2003/0041039 A1* | 2/2003 | Spool | G05B 19/042 705/412 |
| 2003/0216926 A1* | 11/2003 | Scotto et al. | 705/1 |
| 2005/0246215 A1 | 11/2005 | Rackham | |
| 2007/0027701 A1 | 2/2007 | Cohn et al. | |
| 2007/0050232 A1 | 3/2007 | Chang et al. | |
| 2007/0100811 A1 | 5/2007 | Error et al. | |
| 2007/0174109 A1 | 7/2007 | Cohn et al. | |
| 2007/0233566 A1 | 10/2007 | Zlotin et al. | |
| 2007/0265864 A1 | 11/2007 | Chess et al. | |
| 2008/0195567 A1 | 8/2008 | Chen et al. | |

(Continued)

OTHER PUBLICATIONS

Business Objects Text Analysis, Business Objects, 2007.

(Continued)

*Primary Examiner* — Amber A Misiaszek (74) *Attorney, Agent, or Firm* — Lieberman & Brandsdorfer, LLC (57) ABSTRACT

Embodiments of the invention relate to an architectural structure for representing an underlying business and tools to support dynamic adjustment of the structure. A social media metric is created and associated with a business metric of a component represented in the architectural structure, and an impact on the underlying business is identified and measured based upon this association. Accordingly, elements of the structure are parsed and analyzed, and in response to the analysis, the structure is dynamically modified to mitigate receipt of measured negative output data.

18 Claims, 7 Drawing Sheets

(56) References Cited

U.S. PATENT DOCUMENTS

| | | |
|---|---|---|
| 2008/0221940 A1 | 9/2008 | Cohn et al. |
| 2009/0012760 A1* | 1/2009 | Schunemann .................... 703/6 |
| 2009/0119275 A1 | 5/2009 | Chen et al. |
| 2010/0030722 A1* | 2/2010 | Goodson ................ G06Q 30/02 706/54 |
| 2010/0064033 A1* | 3/2010 | Travostino .............. H04L 67/20 709/220 |
| 2010/0076966 A1* | 3/2010 | Strutton et al. ............... 707/728 |
| 2010/0114899 A1* | 5/2010 | Guha et al. ................... 707/741 |
| 2010/0119053 A1* | 5/2010 | Goeldi ..................... 379/265.09 |
| 2010/0145940 A1 | 6/2010 | Chen et al. |
| 2010/0318957 A1 | 12/2010 | Akkiraju et al. |
| 2011/0055385 A1* | 3/2011 | Tung .................... G06F 9/5072 709/224 |
| 2011/0106578 A1* | 5/2011 | Cerminaro ......... G06Q 10/0635 705/7.28 |
| 2012/0209986 A1* | 8/2012 | Shah ..................... G06Q 50/01 709/224 |

OTHER PUBLICATIONS

Converging Text and BI: The Case for a Content Mining Platform, Solution Graph, Mar. 2006.
Russom, P., BI Search and Text Analytics, 2007.
Bogdana, et al., The Role of Business Intelligence in Business Performance Management, 2006-2007.

\* cited by examiner

SYSTEM AND METHOD FOR INTEGRATING TEXT ANALYTICS DRIVEN SOCIAL METRICS INTO BUSINESS ARCHITECTURE

BACKGROUND

The invention relates to measurement of social media impact on a business. More specifically, the invention relates to text analytics and social media tools and their connection into components of a business architecture.

With the advent of electronic media, businesses periodically perform analysis on different aspects of their portfolio, including their brand, reputation, and market sentiment, as well as comparisons with competitors. This analysis is referred to as social media analysis. Such analysis may be performed manually by a text analytics expert, or by a person trained in a capacity to perform such analysis. However, because of the personal expertise involved and the different people who may be providing the expertise, the results obtained are likely to be inconsistent and difficult to replicate. More specifically, a manual based approach that relies on the use of keywords has been known to produce inconsistent data and misidentify relevant information, yielding unpredictable results.

There are current forms of analysis that are software based and use analytic technologies to derive results based on domain-specific keywords. However, there are drawbacks with the known software solutions. Specifically, gaps and inconsistencies result from the use of keywords for such analysis. Accordingly, there is a need for a solution to the known forms of social media analysis that addresses both the inconsistencies and difficulty of obtaining repeatable results.

BRIEF SUMMARY

This invention comprises a method, system, and article for integrating text analytics driven social media metric into a business architecture.

In one aspect of the invention, a computer implemented method is provided for use with a business architecture of an underlying business. The business architecture has at least one business element defined with respect to at least one business metric. At least one element subject for evaluation is selected from the business architecture, and at least one social media metric is created. The social media metric characterizes an attribute of the selected business element. An association is made between the created social media metric(s) and the business metric(s), followed by receipt of observations associated with the social media metric(s). Based upon the received observations, the business architecture is dynamically adjusted.

In another aspect of the invention, a computer program product is provided for use with a business architecture of an underlying business, the business architecture having one or more business elements defined with respect to one or more business metrics. The computer program product includes a computer readable storage medium with embodied program code. The program code supports selecting at least one element from the business architecture for evaluation, and creating at least one social media metric. The social metric characterizes an attribute of the selected business element. Program code is also provided for associating the created social media metric with at least one of the business metrics, and for receiving observations associated with the social media metrics. In addition, program code is provided for dynamically adjusting the business architecture in response to one or more of the received observations.

In yet another aspect of the invention, a computer system is provided with a storage component that includes information describing a business architecture of an underlying business. The business architecture has at least one business element defined with respect to at least one business metric. A functional unit is provided in the system in communication with the storage component. The functional unit includes an evaluation manager, a social manager, a director, and a result manager. The evaluation manager is provided to select at least one element from the business architecture subject to evaluation. The social manager is provided to create at least one social metric, with the social metric characterizing an attribute of the selected business element. The director is provided to communicate with both the evaluation and social managers. More specifically, the director establishes a logical relationship of the created social metric with at least one of the business metrics, and receives at least one observation associated with the social metric. The result manager communicates with the director and dynamically adjusts the business architecture in response to one or more of the received observations.

In yet a further aspect of the invention, a method is provided for enhancing a business architecture. More specifically, keywords are obtained from the business architecture and input into a text analytics engine. In view of the keywords, the text analytics engine generates results that identify at least one social media metric that characterizes one or more factors external to the business. At least one business metric is associated with one or more identified social media metrics. Thereafter, the business architecture is enhanced by integration the business metric(s) into the business architecture.

Other features and advantages of this invention will become apparent from the following detailed description of the presently preferred embodiments of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and a director. A functional unit may be implemented in programmable hardware devices such as field programmable gate arrays, programmable array logic, programmable logic devices, and the like. The functional unit may also be implemented in software for processing by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the manager and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations (e.g., over different storage devices), and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of one or more managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A two phase software based approach is disclosed that automatically integrates one or more text analytics-driven social metrics into a business architecture. The first phase, also known as the setup phase, addresses a method of automatically deriving keywords and business metrics from names, attributes, description, associations, and characteristics of various business elements in a business architecture. In one embodiment, a keyword is a word that serves as a key as to the meaning of another word, a sentence, passage, or the like. During the setup phase the system extracts keywords from attributes of a business element, looks up synonyms, and creates social media metrics. The social media metric characterizes an attribute of the business element. In one embodiment, keywords (e.g., layoff, salary, training, etc.) are derived automatically from the business element description(s), such as the description of the element and business resource planning. In a further embodiment, keywords are then associated with synonyms. A social media metric, also referred to herein as a social metric, is any statistical measure, including but not limited to volume, percentage, and trends, used to measure text analysis output for online consumer generated data. More specifically, the social media metric pertains to the perception of an identified product or service in the marketplace. In one embodiment, keywords may also be defined by the user. The created social media metric(s) is associated with the business metric(s) to complete the first phase.

The second phase, also known as the deployment phase, invokes a text mining analytics engine to populate a value of the social metrics created in the first phase into a selected element of the business architecture. Results from the deployment phase are integrated with a business architecture to yield business metrics. In one embodiment, a business metric is any type of measurement used to gauge some quantifiable component of performance of a business, such as return on investment, employee and customer churn rate, revenues, customer satisfaction, etc. More specifically, the business metric is an element of business architecture, and is used to describe performance of a business. Business architecture refers to business strategy, governance, organization, and key business processes information, as well as the interaction between these concepts. In one embodiment, the setup phase is performed once, whereas the deployment phase is regularly repeated in an effort to track changes of social metrics and a corresponding impact on the business over the course of time.

Businesses are known to model their operational elements in a business architecture. More specifically, business architecture refers to the business strategy, governance, organization, and key business processes information, as well as the interaction among these concepts. A target business architecture describes the products and/or service strategy, and the organizational, functional, process, information, performance, and geographic aspects of the business environment, based on business principles, business goals, and strategic drivers. The business architecture is used to document and communicate the current situation of the subject business in order to drive business actions. Accordingly, a method and system are employed to identify keywords to be used by a text analytics tool, generation of social media metric(s), conversion of the social media metric(s) to business metric(s), and inclusion of generated results as part of the business architecture.

The business architecture decomposes the business into a map with business elements related to business metric(s).

The map represents an operation-oriented structure of the business in terms of its constituent business components. Each component has the capability of performing certain ones of its functions independently of the other components, thereby permitting specific parts of the business that require attention to be honed based on analytical context. Business components also function as a binding force that associates the business elements.

The text analytics tool is employed in two phases: a setup phase and a deployment phase. The setup phase involves defining keywords, a time search interval, and rules for filtering and modeling data. The deployment phases involves a data acquisition task responsible for collecting a set of documents based on the query keywords and a time interval defined in the setup phase, and a model generation task to break down each document collected into a set of snippets. In one embodiment, a snippet includes between two and three sentences that contain a given keyword. The result of the deployment phase is various statistical results.

As noted above, there are two elements that are combined to support the setup and deployment phases. These elements are extended to support the integration thereof. More specifically, the business architecture platform is extended to incorporate keywords and to associate them with synonyms. This integration element shifts keyword creation responsibility from a text analyst to a business person, and in one embodiment automates at least part of the keyword creation process. The business architecture platform is also extended with the social media metric. More specifically, in the business architecture platform the business person creates the social media metrics based on keywords, business elements, and time frame. To reduce the quantity of social media metrics to a relevant set, the business person selects one or more relevant social media metrics. In the deployment phase, the social media metric values may be updated. The integration of social media metrics into the business architecture platform supports a connection to relevant business elements. Based upon these connections, the business person can create one or more heat maps to illustrate how the social media metrics impact the business. A heat map is a visual representation of data using indicia. In one embodiment the heat map(s) may be employed to monitor changes in the social media on a regular basis.

Figure 1:
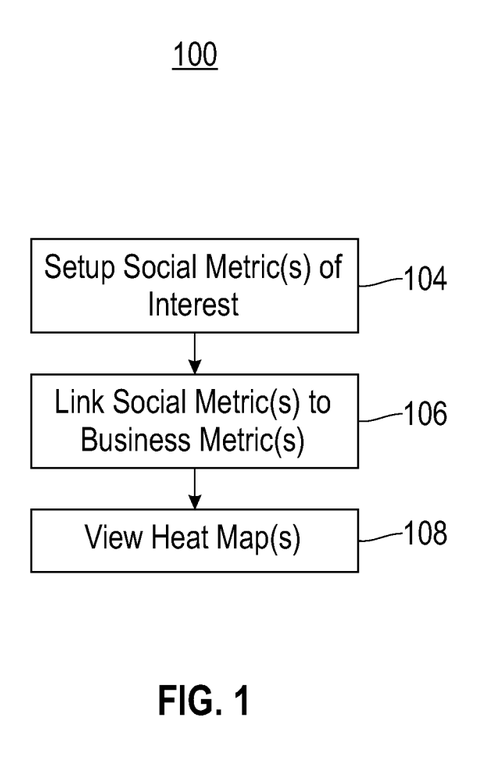
FIG. 1 is a flow chart illustrating a broad aspect of the setup phase.

FIG. 1 is a flow chart (100) illustrating a broad aspect of the setup phase described above. One or more business people set up or create one or more social media metrics that are of interest to the business (104). More specifically, the social media metrics setup is employed to track, analyze, and identify aspects of affected business components. In one embodiment, the people employed for the setup and selection at step (104) are a product manager or a human resource manager. Following step (104), the created social media metrics are linked to business metrics (106). In view of information external to the business that is then collected (e.g., through on-line searching, as discussed herein) values for the created social media metrics are obtained, which may then be viewed on one or more heat maps (108).

Figure 2:
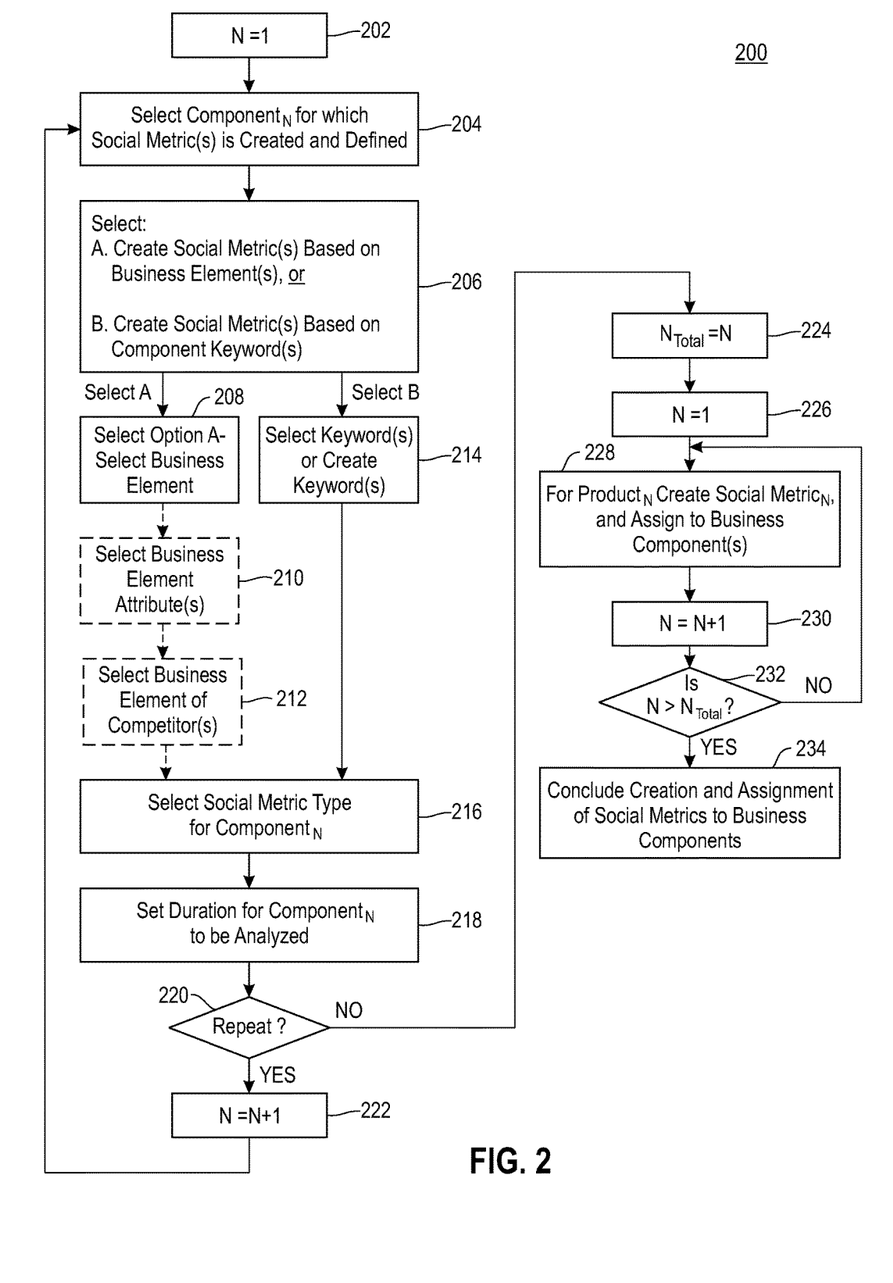
FIG. 2 is a flow chart illustrating a process for creation of social media metrics and assignment to business components.

A detailed illustration of the first phase of the setup process is shown in FIG. 2 in the form of a flow chart (200) illustrating a process for the creation of social media metrics and assignment to business components. In one embodiment, and as employed in this illustration, a product manager and/or a human resource manager setup social media metrics to analyze, track, and identify affect components. The social metrics are created and linked to business metrics, which are later viewed on one or more heat maps. Prior to actual selection, a counting variable, N, is set to the integer value of one (202), followed by selection of a business component$_N$ for which a set of social media metrics are to be created and defined (204). Two options are provided to create social media metrics (206), including a social media metric based on business elements, such as a product or a competitor's product, and a social media metric based on component keywords. Accordingly, social media metrics are created for each business component.

If the manager is to compare the social metric of a product to the social metric of a competitor's product, the manager selects creation of social media metrics on the basis of business element(s) (208). The selection at step (208) is based upon the total perception of all company products, including attributes of the business element(s), such as but not limited to checking account, savings account, mortgage, credit card, etc. In addition to the selection of business element(s) at step (208) and under the category of business element selection, the business element attribute may be optionally selected (210). In one embodiment, the selection at step (210) may provide a product understanding regarding the social metric perception of product issues. For example, the business attribute selected at step (210) may include fraud. Finally, the manager may optionally select a business element pertaining to competitors (212). The selection at step (212) focuses the comparison to be conducted on products associated with the interest of the subject business to those of its competitors. In one embodiment, the competitor and their associated products can be derived from a company's existing business architecture. For example, a product element contains the product groups, and under each product group, the products of the company as well as the products of the competitors are defined. Accordingly, the company may be selective as to which competitors the product comparison should pertain, and as such may discriminate among competitors.

As indicated above at step (206), as part of the set-up phase the company may create social media metrics based on component keywords. More specifically, one or more keywords may be selected from a list of existing keywords, or new keywords may be created and employed from a new product component or a synonym thereof (214). Accordingly, the selection initiated at step (206) enables the set-up process to delineate between social media metrics and component keywords.

Following completion of the selections at steps (208)-(212) or step (214), a social media metric type is selected for component$_N$ (216). More specifically, at step (216), the manager selects a social media metric type use to create social media metric instances. Examples of social media metric types include, but are not limited to, trend, sentiment, volume, and frequency. Trend, volume, and frequency are directly related to sales and/or movement of a product or service. Sentiment is a characteristic that provides a score of how often products have been mentioned positively, neutrally, or negatively by the social media. Similarly, the manager sets a duration for the selected business component$_N$ to be analyzed (218). Examples of the duration set at step (218) include, but are not limit to one year, six months, three months, etc. Following step (218), it is determined if the manager wants to repeat the setup process illustrated in steps (204)-(218) for a different business component (220). A positive response to the determination at step (220) is followed by an increment of the counting variable (222) and a return to step (204). Conversely, a negative response to the determination at step (220) concludes the product selection process by assigning the value of the counting variable to the quantity of components evaluated (224).

Based upon the social media metric selection(s), a business architecture platform creates the social media metrics and automatically assigns them to the corresponding or selected business components, also referred to herein as business elements. As shown in the setup process, at least one business component has been selected. Prior to creation and assignment of the social media metrics, the counting variable N is reset to the integer one (226). For product$_N$, a text analytics tool creates social media metrics, $SSM_N$ and assigns the created metrics automatically to the business component(s) (228). As this assignment is repeated for all other selected products, the variable N is incremented (230), followed by a determination as to whether other business components were selected and are not yet assigned (232). A negative response to the determination at step (232) is followed by a return to step (228). However, a positive response to the determination at step (232) concludes the creation and assignment of the social metrics to the business components with commitment of the social media metrics to the text analytics tool (234). Accordingly, the creation and assignment of the social media metrics is performed for each selected business component.

The text analytics tool generates a list of queries using information from predetermined competitors and product business elements. These queries, combined with the time interval for the search as selected at step (218), are used to automatically and periodically acquire data from one or more third part social media providers. In one embodiment, the text analytics tool automatically loads a set of initial definitions using information from the competitor and product business elements. Accordingly, the business modeling and text analytics engine are integrated in a seamless and automated fashion with direct communication from the business modeling to the text analytics tool.

Figure 3:
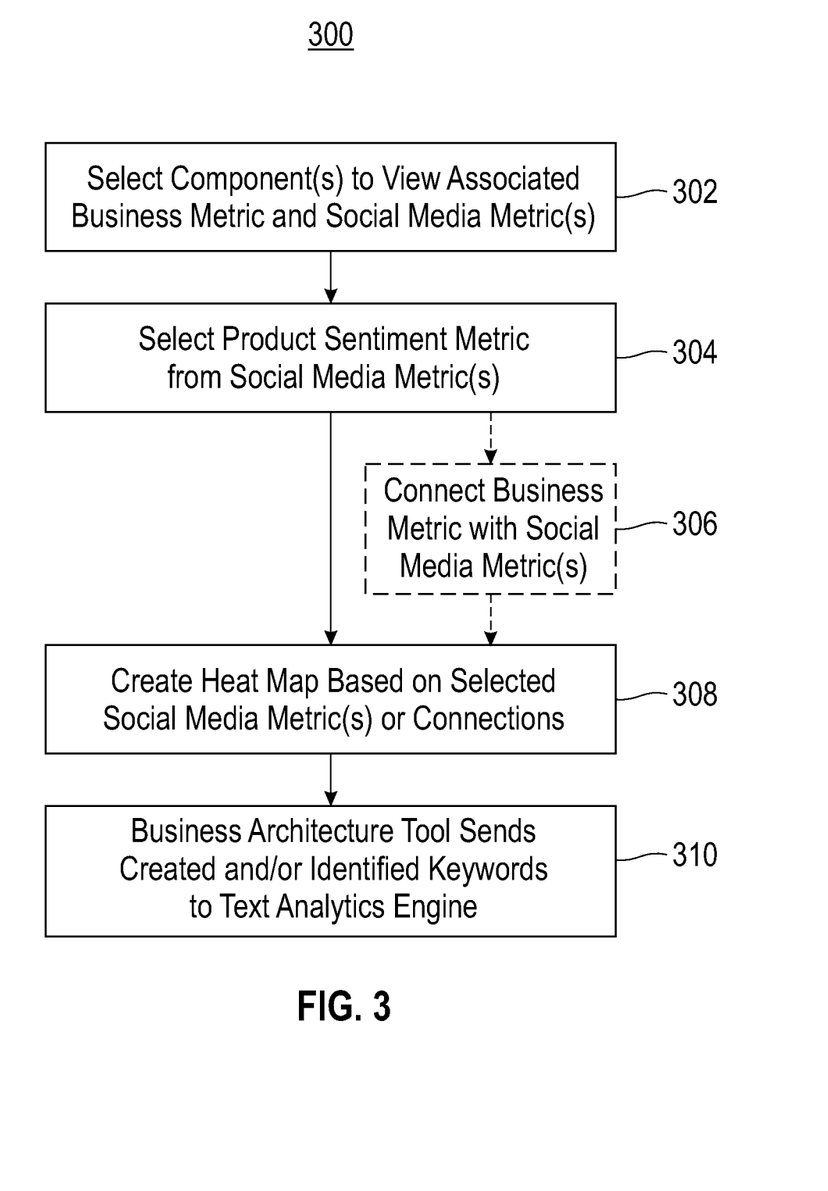
FIG. 3 is a flow chart illustrating a process for establishing a connection between social media metrics and business metrics for each functional component of an enterprise, as well as for the creation of heat maps.

Once the social media metrics are created and assigned to business components, as shown in FIG. 2, a second phase of the setup process takes place. FIG. 3 is a flow chart (300) illustrating another part of the setup process wherein an association between social media metrics and business metrics is established for each functional component of an enterprise, as well as creation of heat maps. More specifically, the process shown herein is based upon the setup process wherein it is determined how the social media metrics associate with the existing business metrics. With this connection, heat maps are designed based upon the new social media metrics, as well as their association to the business metric.

As shown, one or more components are selected for a view of their associated business metrics and social media metrics (302). In one embodiment, the product manager views the new social media metrics, which were automatically assigned to the product or component that measures the sentiment of both the product(s) of the business and the product(s) of its competitor. Following the component selection at step (302), a product sentiment metric is selected from the social media metrics (304). More specifically, the manager establishes minimum and maximum values for the product sentiment metric for both the product of the business and the competitor(s) product, respectively. Following the selection at step (304), an association of the business metric with the social media metrics may optionally take place (306). More specifically, as the social metric sentiment of the products of the business correlates highly with the business metric, the business metric automatically creates an association between the social media metric and the business metric. Following the connection at step (306) or the selection at step (304), a heat map is created based upon selected social media metrics or associations of social media metrics to business metrics (308). In one embodiment, a heat map of a business is a page view of components that comprise the business. Accordingly, the heat map is an interactive visual tool for evaluation of the social media metrics.

A heat map is created based upon the social media metric of product sentiment of both the product(s) of the business and select competitor product(s). More specifically, a legend entry label is assigned to each subject product with defined colors for each legend entry. For example, in a heat map with three products, a first color identifies when a product is below a minimum value, a second color identifies when a product is between minimum and maximum values, and a third color identifies when a product is above a maximum value. Accordingly, the heat map is defined for the evaluation of social media metrics, and specifically as a visual technique to integrate social media metrics with business metrics, and more specifically, the heat map highlights components that need special attention with a threshold assigned to the highlighted components.

As shown, in both phases of the setup, the business architecture is defined, social media metrics are created and connected to business metrics, and social media metric heat maps are designed. The final part of the second phase of the setup process includes a business architecture tool sending the keywords that were created or identified at steps (214) and (208), respectively, to the text analytics engine (310). The setup phases are followed by a deployment phase in which the latest social media metric values are populated into a selected element of the business architecture. The setup phase is typically done once, whereas the deployment phase is repeated on a regular basis so as to track changes to the social metrics and the corresponding impact to the business over time. In one embodiment, the setup phases can be repeated, if necessary, to identify additional social metrics, or to meet new requirements. Accordingly, the setup phases incorporate at least two parts, as demonstrated in FIGS. 2 and 3, and may be repeated based upon circumstances.

Figure 4:
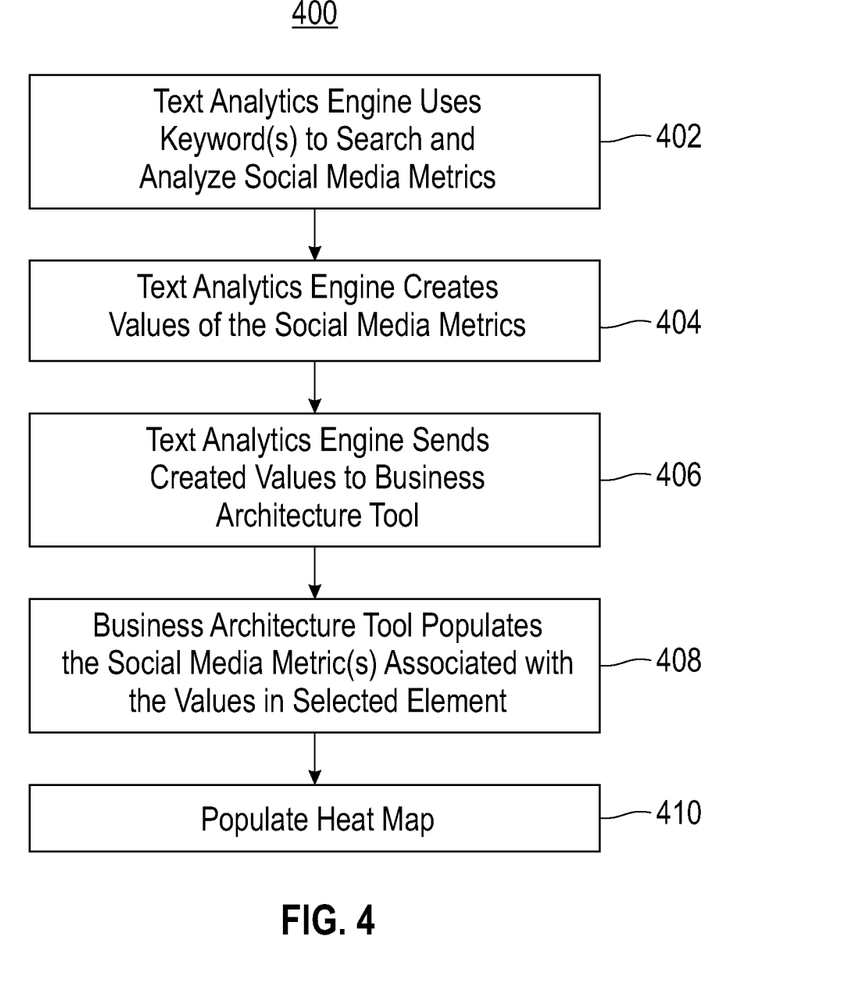
FIG. 4 is a flow chart illustrating the deployment process wherein the created heat maps are populated.

FIG. 4 is a flow chart (400) illustrating the deployment process wherein the heat maps created in the setup phases are populated. The deployment phase starts with the text analytics tool performing the following functions: using the created or identified keywords to search and analyze the social media metrics (402), creating values of the search and analyzed social media metrics (404), and sending the created values of the social media metrics to the business architecture tool (406). Steps (402) and (404) shown herein use the keywords to search documents on a data source to find textual information, such as documents, referencing the same keywords. In one embodiment, the data source for the search may be conducted on an interconnected public network, such as the Internet, or a private network. The search yields matches that are deemed relevant to judging market sentiment, how a product is perceived, etc. The volume of hits is returned from the search, and social media metrics are computed and analyzed based upon the returned hits. Social media metrics that are computed may include, but are not limited to, sentiment and product trend. For example, sentiment may be determined based upon positive or negative words present within the returned hits. Following receipt of the created values at step (406), the business architecture tool populates values in the social media metric(s) associated with the selected elements of the business architecture (408), and populates these values into the heat map created during the setup phases (410). Accordingly, the deployment process employs the tools created in the setup phases to populated values into the heat map.

Figure 5:
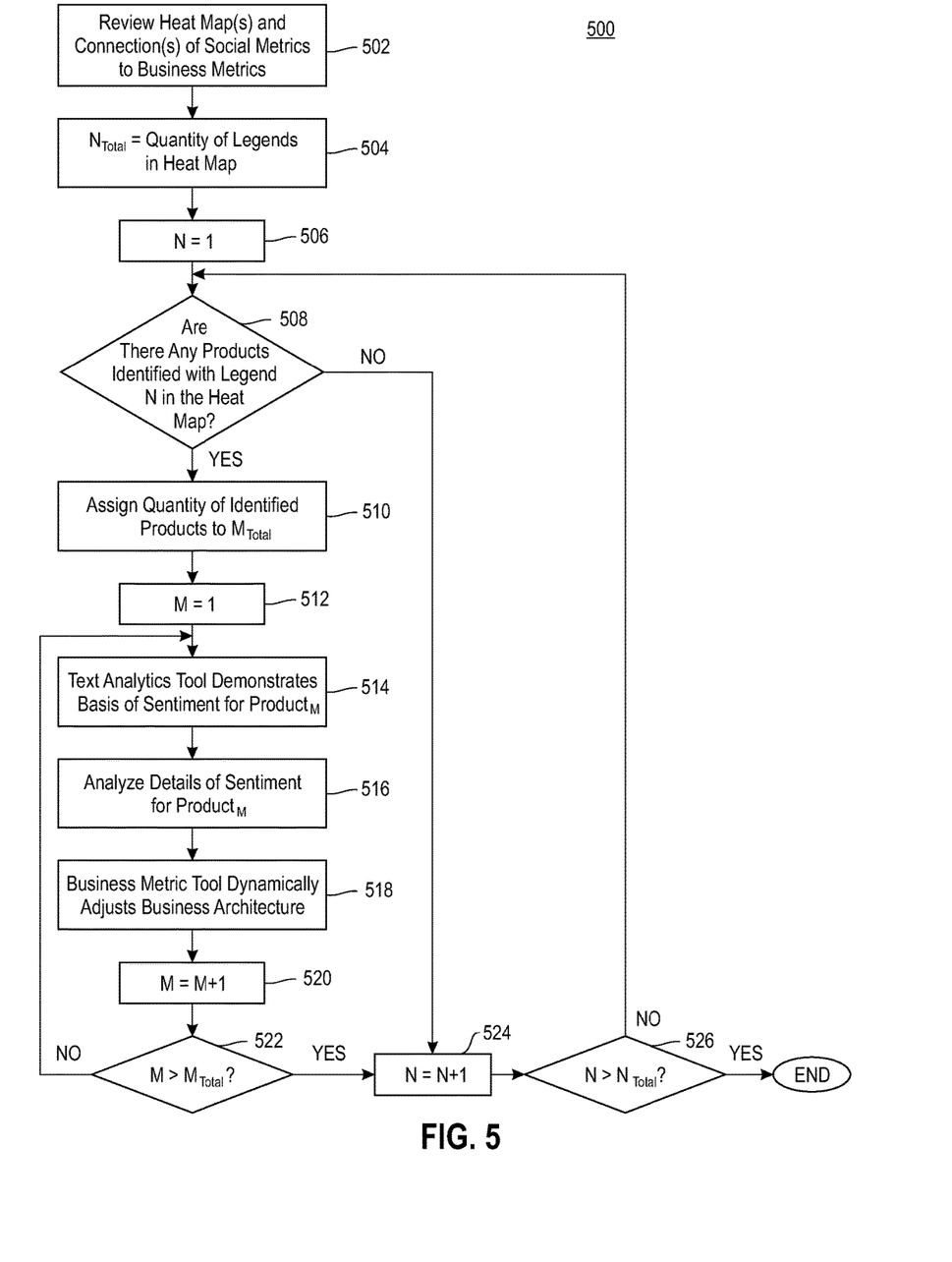
FIG. 5 is a flow chart illustrating the deployment process wherein the social media metrics are viewed and analyzed in a business context and the business architecture may be adjusted accordingly.

Following population of the heat map, the deployment process continues with viewing and analyzing the social media metrics in a business context and the business architecture. FIG. 5 is a flow chart (500) illustrating continuation of the deployment process. More specifically, the deployment phase starts at step (502) where heat maps designed during the setup phase, as well as connections of social metrics to business metrics are reviewed. Each heat map has legend entries for media metrics, which are shown for relevant components. The legend entries reflect the product sentiment of the company, and that of identified competitors. In one embodiment, a legend entry includes indicia, such as colors to identify the product sentiment, such as red if the social media metric is below the minimum value, orange if it is between the minimum and maximum value, and green if it is above the maximum value. The heat map may be based upon different kind of social media metrics. When the social media metric is below a minimum value as reflected in the corresponding legend entry, the product manager needs to better understand in which context the company's products are mentioned negatively in the social media. Accordingly, the heat map provides a visual tool in which product sentiment can be viewed and analyzed.

Prior to actual selection of a legend entry, the variable $N_{Total}$ is set to reflect a quantity of legend settings in the associated heat map (504) with the value of one set to reflect a negative rating, with each higher value representing an incrementally higher rating. (In one embodiment, the rating assignments may be inverted, and as such, the invention should not be limited to the rating assignment demonstrated herein.) A counting variable, N, is set to the integer value of one (506). As noted above, the heat map employs a legend to identify and reflect product sentiment. In one embodiment, there are three colors in the heat map with the color that reflects a negative rating assigned to the integer one, the color that reflects a value between the minimum and maximum rating assigned to the integer two, and the color that reflects a value above the maximum rating assigned to the integer three. Following step (506), the product manager may review one or more products associated with a specific sentiment rating, including any of the ratings associated with the values identified above. In one embodiment, the product manager may set a protocol to only view those product sentiments that are negative, to further evaluate the product and the basis for the negative sentiment and to understand in which context the associated business product(s) is mentioned negatively in the social media. For example, a protocol may be established to view all negative rated products, in which a test is set to return all products associated with a legend identifier less than two. Similarly, a protocol may be established to view all products with a negative or neutral rating, in which case the test would be set to return all products associated with a legend identifier less than three. The product manager may manually view the heat map to select products associated with a specific legend, or a protocol may be established to identify for the manager all products associated with a specific legend. Accordingly, output from analysis of the heat map is applied to one or more business metrics, and in some circumstances may include changing a value setting of an underlying business element.

For illustrative purposes, a test is employed to determine if there are any products with a negative sentiment in the associated heat map (506). A positive response is followed by identifying each product in the heat map with a sentiment associated with N (508) and assigning the quantity of products to the counting variable $M_{Total}$ (510). To assess each product separately, a counting variable M is set to the integer one (512). Thereafter, the text analytic tool is invoked to demonstrate the basis of the sentiment to the manager for $Product_M$ (514). More specifically, the text analytics tool employs a sentiment graphic for the selected legend entry, and the underlying social media metrics are shown. In one embodiment, the manager may select product sentiments that are negative, as positive product sentiments may not require any corrective action. However, the invention should not be limited to reviewing only products reflected with a negative sentiment. To understand why the product received a negative rating by the social media, the product manager analyzes details associated with the sentiment for $Product_M$ (516). In one embodiment, the details may include snippets pertaining to product specific problems experienced by customers.

Following the analysis at step (516), the business metric tool dynamically adjusts the business architecture in response to a received observation and to impact the social media (518). More specifically, the business metric tool analyzes what affect an identified problem associated with the negative sentiment may have on the business, and determines how the business needs to change in order to address the identified problem. In one embodiment, the product manager may increase a target value of the product quality, which in effect may require changes to the connected processes, organization units, and applications. Accordingly, a dynamic action is implemented on the business architecture in an effort to change the social media sentiment.

To accommodate all products with an associated sentiment M, the counting variable M is incrementally increased (520). It is then determined if there are any more products associated with the rating M that need to be analyzed and have adjustments accommodated (522). A negative response to the determination at step (522) is followed by a return to step (514). However, a negative response to the determination at steps (508) or (522) is followed by an incremental increase of the counting variable N (524), and a decision as to whether any of the products associated with a higher incremental rating are to be assessed (526). A negative response to the determination at step (526) is followed by a return to step (508). It should be noted that in one embodiment, the manager may set a maximum value for N and this is reflected by the integer assigned to $N_{Total}$. A positive response to the determination at step (526) concludes the deployment process. Accordingly, settings may be employed to analyze specific products and to dynamically adjust the business architecture to impact the social media.

As demonstrated in FIG. 5, the business architecture is aligned with changes observed in social media. In one embodiment, a product manager may monitor the social media perception of a product or service on a periodic basis, such as weekly, monthly, quarterly, semi-annually, annually, etc. This periodic analysis supports adjustments to the business architecture based on short-term and long-term actions. In one embodiment, the manager may employ a protocol to import social media metrics values from the text analytics tool, as demonstrated in FIG. 5, based upon a specific time period. The legend in the heat map is modified to reflect trends over the specified time period, and the analysis is based upon data associated with the selected legends.

Figure 6:
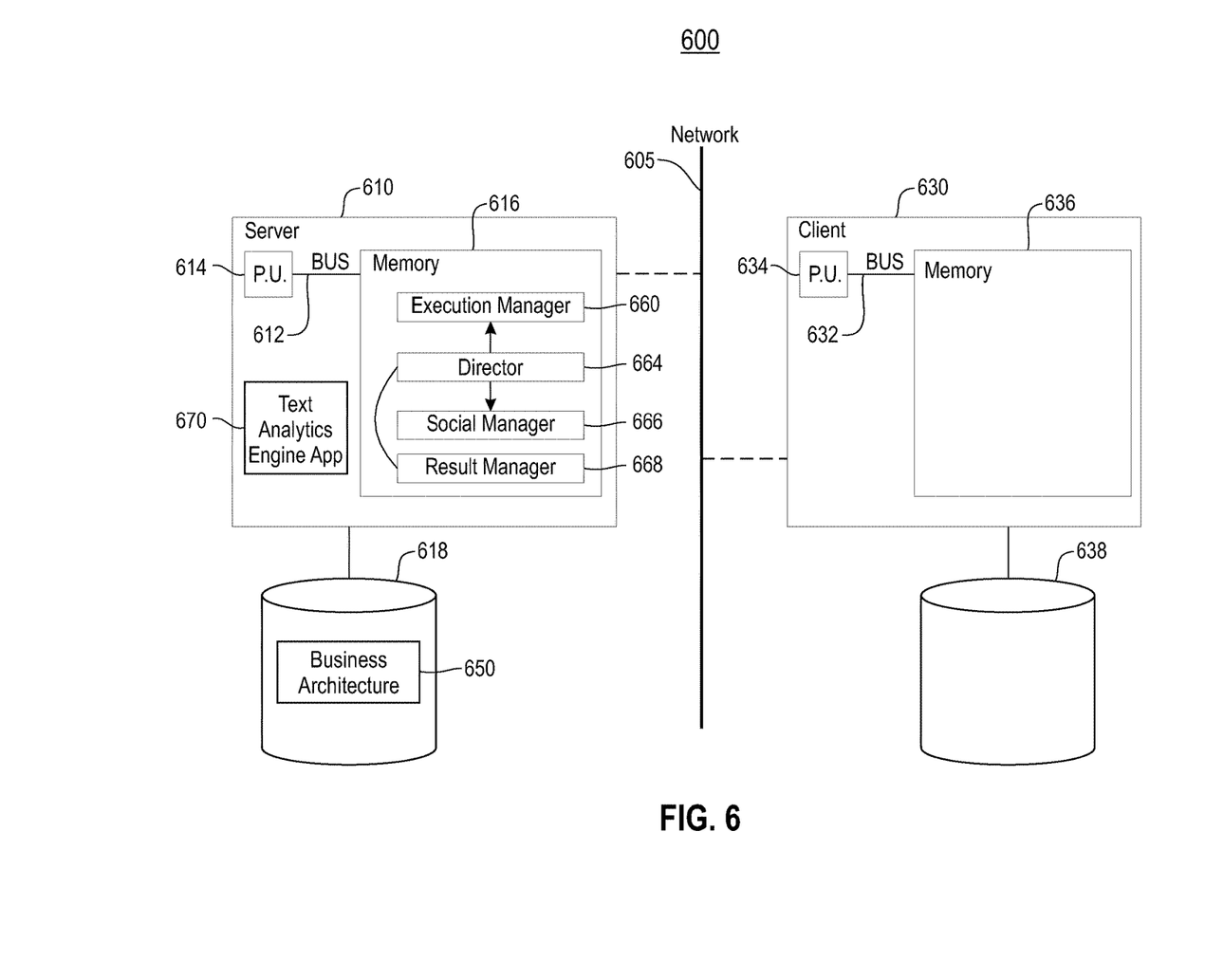
FIG. 6 is a block diagram illustrating tools embedded in a computer system to support integration of text analytics driven social metrics into a business architecture.

As demonstrated in the flow charts of FIGS. 1-5, a method is employed to support the integration of text analytics driven social metrics into a business architecture, and more specifically, dynamic adjustment of the business architecture to align it with changes of the social media metrics. FIG. 6 is a block diagram (600) illustrating tools embedded in a computer system to support integration of business and social metrics as well as deployment and dynamic adjustment of the business architecture. As shown, a computer system is provided with a server (610) in communication with at least one client machine (630) across a network connection (605). In one embodiment, a plurality of client machines may be in communication with the server (610). The server (610) is provided with a processing unit (614) in communication with memory (616) across a bus (612), and in communication with data storage (618). In one embodiment, the server (610) may communicate with remote data storage (not shown) across the network connection (605). Similarly, the client (630) is provided with a processing unit (634) in communication with memory (636) across a bus (632), and in communication with data storage (638).

It is known that businesses model their operational elements in a business architecture. Such elements may include business strategies, business goals, business processes, organizational structure, and business metrics. These elements are aligned in that the business architecture illustrates various relationships among the elements. In one embodiment, the business architecture is used to model the current state of the business. As shown, the business architecture (650) of an underlying business, or more specifically information describing the business architecture of an underlying business, is represented and stored in data storage (618). In one embodiment, the business architecture (650) is represented in a data structure. The business architecture (650) in its embodied structure has at least one business element defined with respect to at least one business metric.

To support the functionality associated with the business architecture (650), an evaluation manager (660) is provided to evaluate the underlying business represented in the business architecture (650). As shown herein, the evaluation manager (660) is local to the server (610). The evaluation manager is responsible for selection of one or more elements defined in the business architecture for evaluation. To support the social media metric aspect of the invention, a social manager (662) is provided to create one or more social metrics. Each created social metric characterizes one or more attributes of the selected business element. A director (664) is provided to communicate with both the evaluation and social managers (660) and (662), respectively. More specifically, the director (664) establishes a logical relationship of the social metric(s) created by the social manager (662) with the business metric(s) associated with the selected element as defined in the business architecture (650). In addition, the director (664) receives one or more observations associated with the social metric. Accordingly, although the evaluation manager (660) and social manager (662), respectively, have separate functionality, the director (664) communicates with both of them to leverage their acquired data and to establish a logical relationship therefrom.

As shown herein, a text analytics engine (670) is provided in the system. As shown herein, the text analytics engine (670) is local to the server (610). However, in one embodiment, the text analytics engine may be in communication with the server (610) across the network (605). More specifically, the text analytics engine (670) functions to collect, filter and interpret online content, including words, phrases, and/or internal corporate information. The director (664) uses the social metric(s) as input to the text analytics engine (670), which in turn collects and analyzes data characterizing a factor that is external to the underlying business. In one embodiment, the director (664) identifies and measures an impact on the factor. Similarly, in another embodiment, the director (664) utilizes a heat map (not shown) to visually demonstrate the logical relationship of the social metric, as created, with the business metric associated with the selected component.

A result manager (666) is provided in communication with the director (664). The result manager (666) supports dynamic adjustment of the business architecture in response to an observation received from the director (664). More specifically, the result manager (666) accounts for a logical relationship as established by the director (664), to enable the result manager (666) to modify the business architecture in a manner that is consistent with one or more observations received from the social metric. In one embodiment, the result manager (666) analyzes data represented in the heat map utilized by the director (664) to derive output. Similarly, in another embodiment, the result manager (666) applies the derived output to one or more of the business metrics. Accordingly, the director (664) and the result manager (666) function to support and implement dynamic adjustment to the business architecture.

As identified above, the evaluation manager (660), social manager (662), director (664), and result manager (666) function as elements to support the dynamic adjustment of the underlying business architecture. The managers and director (660)-(666) are shown residing in memory (616) local to the server (610). However, the managers and director (660)-(666) may reside as hardware tools external to memory (616), or they may be implemented as a combination of hardware and software. Similarly, in one embodiment, the managers and director (660)-(666) may be combined into a single functional item that incorporates the functionality of the separate items. In one embodiment, a benefit associated with combining the managers and director into a single functional unit, includes but is not limited to, empowering business users to leverage social media data for increased decision making efficiencies. As shown herein, each of the managers and director (660)-(666) are shown local to the server (610). However, in one embodiment they may be collectively or individually distributed across the network (605) and function as a unit to manage integration of text analytics to support dynamic adjustment of the underlying business architecture. Accordingly, the managers and director may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
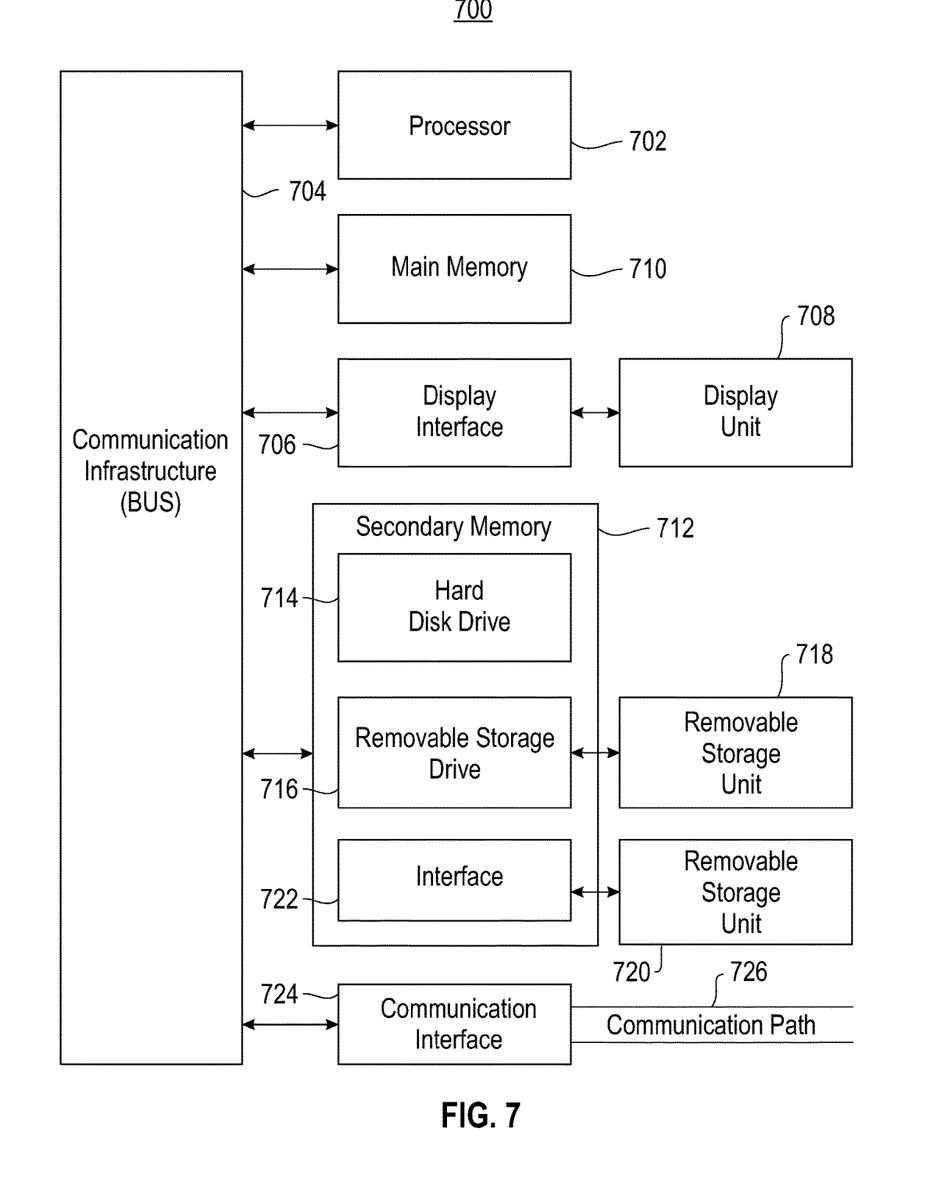
FIG. 7 is a block diagram showing a system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured to apply to social networking products and sites. Accordingly, the scope of protection of this invention is limited only by the following claims and their equivalents.

We claim:

1. A computer implemented method for use with a business architecture of an underlying business, the business architecture documenting and communicating a current situation of the underlying business in order to drive business actions, the method comprising:
  selecting, by a processor in communication with memory, an element from a data structure representing a business architecture of an underlying business for evaluation, the business architecture comprising a map having one or more elements associated with one or more respective business metrics, wherein each business metric is a quantifiable component reflecting performance of an element; and
  integrating, by the processor, social media data into the business architecture, the integration comprising:
    automatically creating a social media metric based on the selected element, including automatically deriving the social media metric from the selected element, wherein the social media metric characterizes one or more attributes of the selected element, and wherein the social media metric is a statistical measure reflecting consumer perception contained within online consumer generated data;
    automatically assigning the created social media metric to a business metric;
    producing a correlation between the social media metric and the assigned business metric;
    creating a heat map, including converting the produced correlation, the social media metric, and the assigned business metric into a heat map, wherein the heat map is a graphical user interface to visually display a strength of the correlation between the social media metric and the assigned business metric;
    analyzing data represented in the heat map, including:
      acquiring data from one or more social media providers;
      creating a value for the social media metric based on the acquired data; and
      populating the value of the social media metric into the selected element displayed in the heat map;
    analyzing the heat map including receiving one or more observations associated with the selected element including a change in the social media metric value;
    dynamically adjusting the business architecture in response to the analysis, wherein the adjustment including:
      activating an application and instructing the application for effecting modifications to the data structure of the business architecture including changing a business metric target based on the received observations; and
  executing, by the application, the modifications to the data structure of the business architecture wherein the modifications align the data structure of the business architecture with the change in the social media metric value.

2. The method of claim 1, wherein the creation of the social media metric further comprises inputting at least one keyword describing the one or more attributes into a text analytics engine, the engine collecting and analysing data characterizing one or more factors external to an associated underlying business, and wherein assigning the created social media metric to the business metric further comprises populating a value of the created social media metric into the selected element of the business architecture.

3. The method of claim 1, further comprising identifying and measuring an impact on the underlying business resulting from dynamically adjusting the business architecture.

4. The method of claim 1, wherein changing the business metric target comprises changing a value setting of an underlying business element.

5. A computer program product for modifying a business architecture of an underlying business, the business architecture documenting and communicating a current situation of the underlying business in order to drive business actions, the computer program product comprising a computer readable hardware storage medium having computer readable program code embodied therewith, the program code executable by a processor to:
    select an element from a data structure representing a business architecture of an underlying business for evaluation, the business architecture comprising a map having one or more elements associated with one or more respective business metrics, wherein each business metric is a quantifiable component reflecting performance of a business element; and
    integrate, by the processor, social media data into the business architecture, the integration comprising program code to:
        automatically create a social media metric based on the selected element, including automatically deriving the social media metric from the selected element, wherein the social media metric characterizes one or more attributes of the selected business element, and wherein the social media metric is a statistical measure reflecting consumer perception contained within online consumer generated data;
        automatically assign the created social media metric to a business metric;
        produce a correlation between the social media metric and the assigned business metric;
        create a heat map, including convert the produced correlation, the social media metric, and the assigned business metric into a heat map, wherein the heat map is a graphical user interface to visually display a strength of the correlation between the social media metric and the assigned business metric;
        analyze data represented in the heat map, including program code to:
            acquire data from one or more social media providers;
            create a value for the social media metric based on the acquired data; and
            populate the value of the social media metric into the selected element displayed in the heat map;
        analyze the heat map, including receive one or more observations associated with the selected element, including a change in the social media metric value;
        dynamically adjust the business architecture in response to the analysis, the adjustment including:
            activating and instructing an application for effecting modifications to the data structure of the business architecture including to change a business metric target based on the received observations; and; the application effectuating the modifications to the data structure upon receipt of the instructions, wherein the modifications align the data structure of the business architecture with the change in social media metric value.

6. The computer program product of claim 5, wherein the creation of the social media metric further comprises program code to input at least one keyword describing the one or more attributes into a text analytics engine, the engine collecting and analysing data characterizing one or more factors external to an associated underlying business, and wherein assigning the created social media metric to the business metric further comprises program code to populate a value of the created social media metric into the selected element of the business architecture.

7. The computer program product of claim 5, further comprising program code to identify and measure an impact on the underlying business resulting from dynamically adjusting the business architecture.

8. The computer program product of claim 5, wherein changing the business metric target comprises program code to change a target value setting of an underlying business element.

9. A computer system comprising:
    a storage component that includes information describing a business architecture of an underlying business, the business architecture documenting and communicating a current situation of the underlying business in order to drive business actions, wherein the business architecture comprises a map having one or more elements associated with one or more respective business metrics, and wherein each business metric is a quantifiable component reflecting performance of an element;
    a tool in communication with a processor and the storage component, the tool configured to support dynamic adjustment of the business architecture, including the tool to:
        select an element from a data structure representing the business architecture for evaluation; and
        integrate social media data into the business architecture, the integration comprising the tool to:
            automatically create a social media metric based on the selected element, including automatically deriving the social media metric from the selected element, wherein the social media metric characterizes one or more attributes of the selected element, and wherein the social media metric is a statistical measure reflecting consumer perception contained within online consumer generated data;
            automatically assign the created social metric to a business metric;
            produce a correlation between the social media metric and the assigned business metric;
            create a heat map, including convert the produced correlation, the social media metric, and the assigned business metric into a heat map, wherein the heat map is a graphical user interface to visually display a strength of the correlation between the social media metric and the assigned business metric;
            analyze data represented in the heat map, including:
                acquire data from one or more social media providers;
                create a value for the social media metric based on the acquire data; and
                populating the value of the social media metric into the selected element displayed in the heat map;

the tool to analyze the heat map, including receive at least one observation associated with the selected element, including a change in the social media metric value; and dynamically adjust the business architecture in response to the analysis, including the tool to:

activate and instruct an application for effecting modifications to the data structure of the business architecture including changing a business metric target based on the received observations, and the application effectuating the modifications to the data structure upon receipt of the instruction wherein the modifications align the data structure of the business architecture with the change in the social media metric value.

10. The system of claim 9, wherein the creation of the social media metric further comprises the tool to input at least one keyword describing the one or more attributes into a text analytics engine, wherein the engine collects and analyses data characterizing one or more factors external to an associated underlying business, and wherein assigning the social media metric to the business metric further comprises the tool to populate a value of the at least one created social metric into the selected element of the business architecture.

11. The system of claim 9, further comprising the tool to identify and measure an impact on the underlying business based upon the dynamic adjustment.

12. The system of claim 9, wherein changing the business metric target comprises the tool to change a target value setting of an underlying business element.

13. A method, comprising:

obtaining, by a processor in communication with memory, one or more keywords from a business architecture; and integrating, by the processor, social media data into the business architecture, the integration comprising:

inputting, by the processor, the keywords into a text analytics engine;

using the text analytics engine, in view of the keywords, to create a social media metric, wherein the social media metric characterizes one or more factors external to the business, and wherein the social media metric reflects perception contained within online consumer generated data;

associating a business metric with the social media metric, wherein the business metric is a quantifiable component reflecting performance of an element of the business architecture;

producing a correlation between the associated social media metric and business metric, and converting the produced correlation into a heat map, wherein the heat map is a graphical user interface to visually display a strength of the correlation between the social media metric and the assigned business metric;

analyzing data representing in the heat map, including receiving one or more observations associated with the selected element; and dynamically adjusting the business architecture in response to the analysis, the adjustment including:

changing a business metric target based on the received observations; and activating and instructing an application for effecting modifications to the business architecture, the application effectuating the modifications upon receipt of the instructions.

14. The method of claim 1, wherein the modifications are selected from the group consisting of: changes to connected processes, changes to organization units, and changes to applications.

15. The computer program product of claim 5, wherein the modifications are selected from the group consisting of: changes to connected processes, changes to organization units, and changes to applications.

16. The computer system of claim 9, wherein the modifications are selected from the group consisting of: changes to connected processes, changes to organization units, and changes to applications.

17. The method of claim 13, wherein the modifications are selected from the group consisting of: changes to connected processes, changes to organization units, and changes to applications.

18. The computer program product of claim 5, wherein the computer readable hardware storage medium is a non-transitory computer readable hardware storage medium.

* * * * *